(12) United States Patent
Ekanayake et al.

(10) Patent No.: US 9,239,007 B2
(45) Date of Patent: Jan. 19, 2016

(54) GAS TURBINE COMPRESSOR INLET PRESSURIZATION HAVING A TORQUE CONVERTER SYSTEM

(75) Inventors: Sanji Ekanayake, Mableton, GA (US); Alston I. Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 820 days.

(21) Appl. No.: 13/485,273

(22) Filed: May 31, 2012

(65) Prior Publication Data
US 2013/0318984 A1 Dec. 5, 2013

(51) Int. Cl.
| F02C 6/12 | (2006.01) |
| F02C 7/36 | (2006.01) |
| F02C 6/18 | (2006.01) |
| F02C 6/08 | (2006.01) |
| F02C 9/18 | (2006.01) |

(52) U.S. Cl.
CPC ...... *F02C 6/12* (2013.01); *F02C 6/08* (2013.01); *F02C 6/18* (2013.01); *F02C 7/36* (2013.01); *F02C 9/18* (2013.01); *F05D 2260/211* (2013.01); *Y02E 20/14* (2013.01); *Y02E 20/16* (2013.01)

(58) Field of Classification Search
CPC .......... F02C 7/36; F02C 7/32; F02C 6/18; F02C 6/08; F02C 3/107; Y02E 20/16; Y02E 20/14; F01K 23/10; F02K 3/00; F02K 3/025; F02K 3/04; F02K 3/06
USPC .......... 60/785, 793, 39.24, 262, 226.1, 39.15, 60/39.182, 39.5, 39.511, 226.3
See application file for complete search history.

(56) References Cited

U.S. PATENT DOCUMENTS

| 3,932,058 | A | * | 1/1976 | Harner et al. .................. 416/28 |
| 4,651,521 | A | * | 3/1987 | Ossi ............................. 60/226.3 |
| 5,778,675 | A | * | 7/1998 | Nakhamkin .................... 60/652 |
| 6,308,512 | B1 | | 10/2001 | Kopko |
| 6,442,942 | B1 | | 9/2002 | Kopko |
| 6,530,224 | B1 | | 3/2003 | Conchieri |
| 6,606,848 | B1 | | 8/2003 | Rollins, III |
| 6,718,771 | B1 | | 4/2004 | Kopko |
| 6,880,343 | B2 | | 4/2005 | Kopko |
| 7,065,953 | B1 | | 6/2006 | Kopko |
| 8,099,944 | B2 | * | 1/2012 | Foster et al. ................. 60/226.1 |
| 8,181,442 | B2 | * | 5/2012 | Youssef ...................... 60/226.1 |
| 2003/0106319 | A1 | | 6/2003 | Kopko |
| 2008/0317588 | A1 | * | 12/2008 | Grabowski et al. ........ 415/174.1 |
| 2010/0287948 | A1 | * | 11/2010 | Draper et al. ................... 60/778 |

OTHER PUBLICATIONS

U.S. Appl. No. 13/485,160, filed May 31, 2012, Sanji Ekanayake.

(Continued)

Primary Examiner — Steven Sutherland
(74) Attorney, Agent, or Firm — Ernest G. Cusick; Frank A. Landgraff

(57) ABSTRACT

A supercharging system for a gas turbine system includes a compressor, a combustor, a turbine and a shaft. The supercharging system includes a fan assembly that provides an air stream and a torque converter coupled to the shaft and the fan assembly. The supercharging system also includes a subsystem for conveying a first portion of the air stream output to the compressor; and a bypass subsystem for optionally conveying a second portion of the air stream output to other uses.

14 Claims, 4 Drawing Sheets

(56) References Cited

OTHER PUBLICATIONS

U.S. Appl. No. 13/485,216, filed May 31, 2012, John Anthony Conchieri.
Brandon et al, "Inlet Air Supercharging of a 70 kW Microturbine" Proceedings of GT2006 ASME Turbo Expo 2006: Power for Land, Sea and Air May 8-11, 2006, Barcelona, Spain.
Enhanced Turbine Output LLC, 3000 connecticut Ave, suite 317, Washington DC 20008, "Summary Description of Powercool", www.ETOLLC.com, May 20, 2004, p. 1-2.
Howden Brochure, Variax Axial Flow Fans continually setting new standards, Howden Denmark A/S, Industrivej 23, DK-4700 Naestved, Denmark, 2009, pp. 1-7, www.howden.com.
Voith Turbo, Voith Turbo GmbH & Co. KG, Jul. 12, 2002, pp. 1-20, www.Voithturbo.com.
Wang, T. and Braquet, L, "Assessment of Inlet cooling to enhance output of a fleet of gas turbines", Proceedings of the Thirtieth Industrial Energy Technology Conference, IETC $30^{th}$, New Orleans, May 6-9, 2008.

\* cited by examiner

GAS TURBINE COMPRESSOR INLET PRESSURIZATION HAVING A TORQUE CONVERTER SYSTEM

CROSS-REFERENCE TO RELATED APPLICATIONS

This application is related to concurrently filed application Ser. No. 13/485,160, titled SUPERCHARGED SYSTEM WITH AIR FLOW BYPASS filed jointly in the names of Sanji Ekanayake and Alston I. Scipio, and application Ser. No. 13/485,216, titled GAS TURBINE COMPRESSOR INLET PRESSURIZATION AND FLOW CONTROL SYSTEM filed jointly in the names of John Anthony Conchieri, Robert Thomas Thatcher, and Andrew Mitchell Rodwell, each assigned to General Electric Company, the assignee of the present invention.

TECHNICAL FIELD

The subject matter disclosed herein relates generally to gas turbine systems and more specifically to a gas turbine system with compressor inlet pressurization and a flow control system.

BACKGROUND

Utility power producers use combined cycle systems because of their inherent high efficiencies and installed cost advantage. Combined cycle systems typically include a gas turbine, heat recovery steam generators, generators, controls, and a steam turbine. Combined cycle systems use the hot exhaust gas from gas turbines to make steam, which drives a steam turbine. The combination of a gas turbine and a steam turbine achieves greater efficiency than would be possible independently. The output of a combined cycle system is affected by the altitude and variations in the ambient temperature.

Various methods are available for improving the performance of combined-cycle power plants. Improvements can be made in plant output or efficiency beyond those achievable through higher steam temperatures; multiple steam-pressure levels or reheat cycles. For example, it has become commonplace to install gas fuel heating on new combined-cycle power plants to improve plant efficiency. Additionally, gas turbine inlet air cooling is sometimes considered for increasing gas turbine and combined-cycle output. Another approach is supercharging (compressor inlet pressurization). Supercharging of a gas turbine entails the addition of a fan to boost the pressure of the air entering the inlet of the compressor. Typically, in the case of supercharging the additional stage of compression is not driven by the main gas turbine shaft, but rather by an electric motor. In some cases, the parasitic power of the fan motor is more than the additional output of the gas turbine, so the net result is a capacity loss.

BRIEF DESCRIPTION OF THE INVENTION

In accordance with one exemplary non-limiting embodiment, the invention relates to a supercharging system for a gas turbine system having a compressor, a combustor, a turbine and a shaft. The supercharging system includes a fan assembly that provides an air stream and a torque converter coupled to the shaft and the fan assembly. The supercharging system also includes a subsystem for conveying a first portion of the air stream output to the compressor; and a bypass subsystem for optionally conveying a second portion of the air stream output to other uses.

In another embodiment a gas turbine system includes a compressor; a combustor; a turbine; and a shaft coupled to the turbine. the gas turbine system includes a torque converter and a fan coupled to the torque converter that generates an air stream. A bypass subsystem allocates the air stream between the compressor and other uses.

In another embodiment a method of operating a gas turbine includes coupling a fan assembly to a turbine system shaft with a torque converter. The method also includes determining a first flow rate to be provided to a compressor in the gas turbine; determining a second flow rate to be provided to other uses; and providing the first flow rate to the compressor, and the second flow rate to the other uses.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
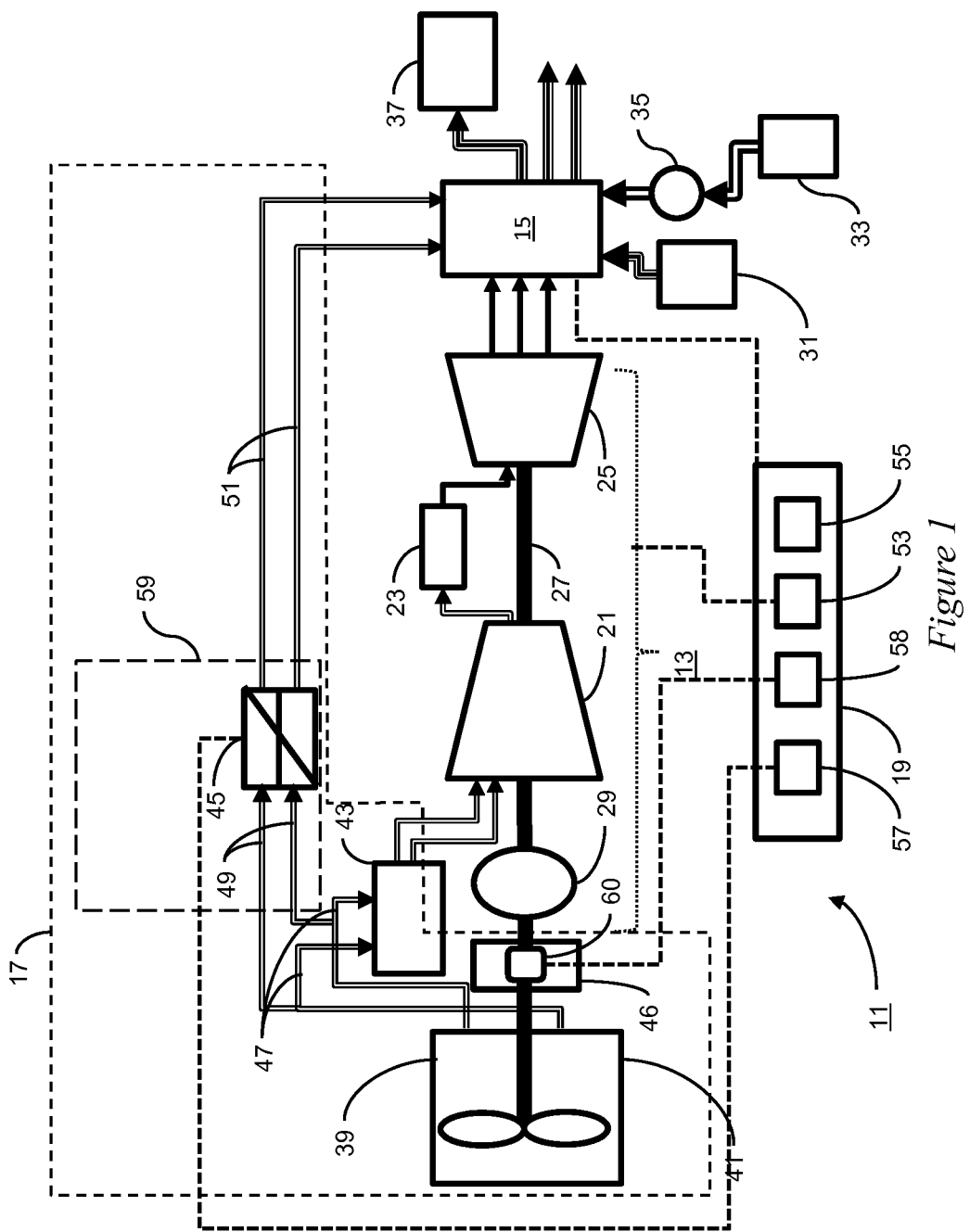
FIG. 1 is a schematic of a supercharged system.
Figure 2:
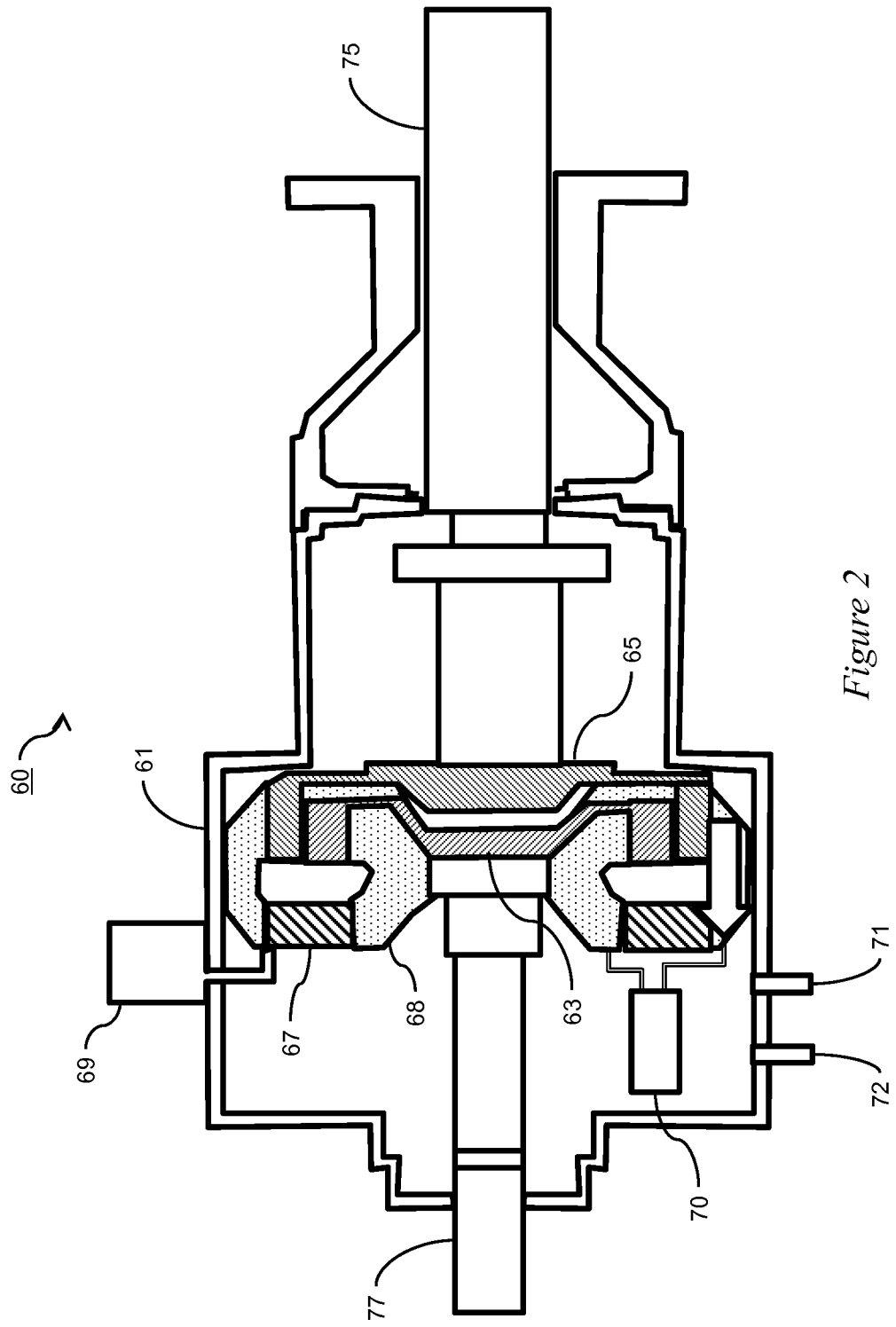
FIG. 2 is a simplified lateral view of an embodiment of a torque converter.

FIG. 1 illustrates a supercharged system 11, including a gas turbine system 13. The supercharged system 11 may also include a heat recovery steam generator (HRSG system 15) a supercharger and bypass system 17, and a control system 19.

The gas turbine system 13 includes a compressor 21 coupled to a combustor 23 and a turbine 25. A shaft 27 couples the compressor 21 to the turbine 25 and may be used to drive a generator and/or mechanical load 29. Fuel and air are mixed in combustor 23 and then ignited providing energy to the gas stream from the compressor 21. The combustion exhaust is forced into the turbine section where the high velocity and volume of the gas flow is directed through a nozzle (not shown) over the blades (not shown) of turbine 25, rotating the turbine 25 which in turns rotates the shaft 27. Shaft 27 powers the compressor 21 and may be used to drive the generator and/or mechanical load 29.

The HRSG system 15 is a heat exchanger that recovers heat from the combustion exhaust. In some cases HRSG system 15 may be provided with fuel or auxiliary steam 31. The fuel may be used to fire a secondary combustion chamber to increase production rates. Water to generate steam is provided by a feed water supply 33. The supply of water may be controlled by valve 35.

The HRSG system 15 may be used to produce steam to drive an external steam host 37 such as a steam turbine. This combination of a gas turbine and the steam turbine produces electricity more efficiently than either the gas turbine or steam turbine alone. The steam generated by the HRSG system 15 may also be used in other processes, such as district heating or other process heating.

The supercharger and bypass system 17 may include a fan assembly 39, an air cooling subsystem 43, a variable geometry diverter 45 and a torque converter system 46.

The fan assembly 39 may include a fan 41. Fan 41 is coupled to the shaft through the torque converter system 46. Fan 41 may have fixed or variable pitch blades. The fan assembly 39 may include other components such as bearings, shrouds, conduits, filters and the like (not shown). The fan assembly 39 provides an air stream at a specific temperature and pressure.

The supercharger and bypass system 17 may include air cooling subsystem 43 to control the temperature of the air stream. The fan assembly 39 may increase the gas turbine inlet temperature therefore air cooling subsystem 43 is necessary to avoiding exceeding compressor temperature limits and high inlet volumetric flow rates. The air cooling subsystem 43 may utilize conventional chilling technologies such as mechanical chillers, media type evaporative coolers and absorption chillers.

The supercharger and bypass system 17 may also be provided with a variable geometry diverter 45 which may include a damper and a bypass duct. The variable geometry diverter 45 may be utilized to optimize both the air stream flow from the fan assembly 39 and the discharge pressure during the acceleration and power loading sequence of the gas turbine system 13. The variable geometry diverter 45 also may be used to adjust power output as a function of varying ambient conditions. The supercharger and bypass system 17 operates in conjunction with air cooling conduits 47, diverter conduits 49 and HRSG conduits 51 to manage the amount of airflow directed to the air cooling subsystem 43 and the HRSG system 15. The air stream provided by the fan assembly 39 may be divided into a first portion to be conveyed to the air cooling subsystem 43 and a second portion to be conveyed to the HRSG system 15. Discharging air from the fan assembly 39 into the exhaust stream may be used to control the air flow from the fan assembly 39 and discharge pressure.

Control system 19 may be used to control the operation of the supercharged system 11. Control system 19 may include a turbine control subsystem 53 that controls the turbine operations and HRSG control subsystem 55 that controls the operations of the HRSG system 15, a supercharger and bypass control subsystem 57 that controls the fan assembly 39 and the variable geometry diverter 45, and a torque converter control subsystem 58 that controls the torque converter system 46. A bypass subsystem 59 includes the diverter conduits 49, the variable geometry diverter 45 and the supercharger and bypass control subsystem 57. The turbine control subsystem 53, the HRSG control subsystem 55, the supercharger and bypass control subsystem 57 and the torque converter control subsystem 58 may be part of a combined control system, or may be separate controls networked together.

The torque converter system 46 may include a torque converter 60, and additional components such as a working fluid reservoir, the lubrication fluid reservoir, filling and draining valves, and the like (not shown). In some cases where the control subsystems are separate, torque converter system 46 may also include the separate torque converter control subsystem 58. Torque converter 60 (hydrodynamic fluid coupling) may include a housing 61, a pump wheel 63, a turbine wheel 65 and adjustable guide vanes 67. The pump wheel 63, the turbine wheel 65 and the adjustable guide vanes 67 interact within a fluid cavity through which the working fluid flows. The torque converter 60 may also include guide vane actuators 69 that position the adjustable guide vanes 67. The torque converter 60 may also include a working fluid pump 70 coupled to a working fluid supply 71 and working fluid returns 72. The gas turbine system shaft 27 may be connected to an input shaft 75 that may in turn be connected to the pump wheel 63. An output shaft 77 may be connected to the turbine wheel 65 and may be coupled to the fan 41.

In operation, the mechanical energy of the input shaft 75 is converted into hydraulic energy through the pump wheel 63. The turbine wheel 65, converts hydraulic energy back into mechanical energy that is transmitted to the output shaft 77. The adjustable guide vanes 67 regulate the mass flow in the circuit. When the adjustable guide vanes 67 are closed (small mass flow) the power transmission is at its minimum. With the adjustable guide vanes completely open (large mass flow), the power transmission is at its maximum. Because of the change in mass flow (due to the adjustable guide vanes 67) the speed of the turbine wheel 65 may be adjusted to match the various operating points of fan 41. At low speed, the turbine develops its highest torque. With increasing turbine speed, output torque decreases.

By varying the volume of the working fluid the degree of coupling from the input shaft 75 to the output shaft 77 may be varied. This provides the ability to vary the rotational speed of the fan 41.

The fan 41 may be decoupled from the shaft 27 by emptying the working fluid the torque converter 60.

Driving the fan 41 with a variable speed hydrodynamic fluid coupling (torque converter 60) in place of a direct drive configuration allows for operating the fan 41 at variable speeds thereby providing for the control of the flow rate of the airstream provided by the fan 41. The fan 41 in combination with the torque converter system 46 improves the part-load efficiency and overall flexibility and reliability of the system. The variable speed hydrodynamic fluid coupling (torque converter 60) improves the system part load efficiency by minimizing the need to throttle flow on a fixed speed supercharger fan. The torque converter 60 improves the system overall reliability by providing the means quickly de-couple the fan 41 from the shaft 27 in case of a failure of the fan 41 or other components of the supercharger and bypass system 17.

Figure 3:
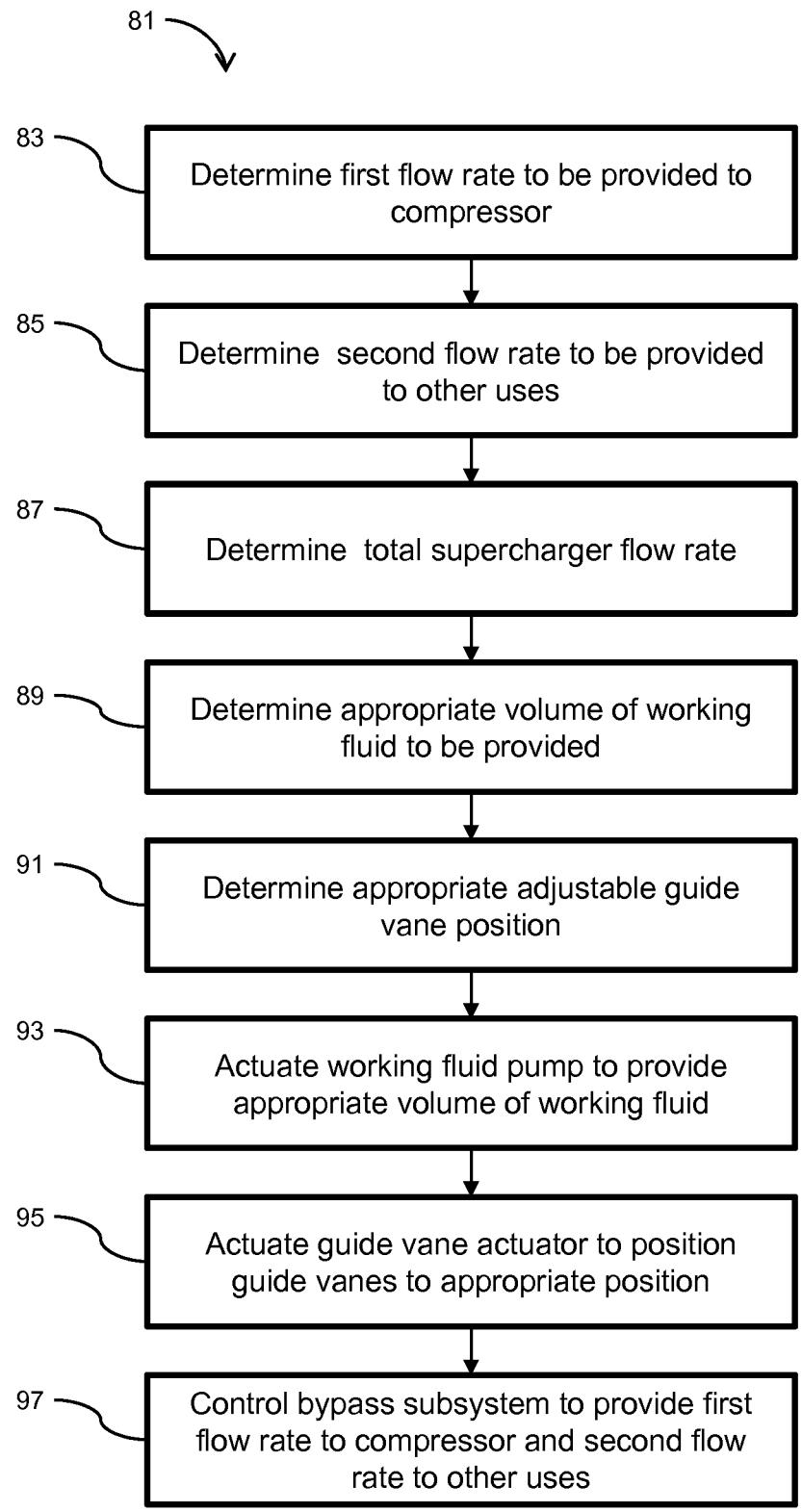
FIG. 3 is flow chart of an exemplary method of operating a supercharged system.

FIG. 3 illustrates a method of operating a supercharged system 11 (method 81). The method 81 may determine a first flow rate to be provided to the compressor (method element 83). The first flow rate may be determined based on, among other parameters, the operating conditions, the desired output, and the operating envelope for the gas turbine system 13. For example, the level of supercharging may be determined by a desire to increase the power output at a faster rate or in the case of a supercharged system 11 with an HRSG system 15, by the amount of air required to purge the HRSG system 15. Other factors such as compressor fan limitations, fan operability levels (surge line), whether the gas turbine system is operating at its start cycle may determine the first flow rate to be provided to the compressor 21. The method 81 may determine a second flow rate to be provided for other uses (method element 85). The first flow rate may also be a function of uses for the second flow rate. For example if the gas turbine system 13 is part of a supercharge system 11 having an HRSG system 15 with duct combustion then the second portion may be determined on the basis of the oxygen level desired for the duct combustion, thereby determining the first flow rate. Other uses for the second flow rate may include controlling exhaust gas temperatures, controlling the oxygen content of the exhaust, compartment ventilation, plant HVAC and other cooling/heating air services. The method 81 may determine the total flow rate to be provided by the supercharger and bypass system 17 (method element 87). The method 81 may then determine the appropriate volume of working fluid to be provided to the torque converter 60 (method element 89). The method 81 may determine the appropriate position of the adjustable guide vanes 67 (method element 91). The method 81 may actuate the working fluid pump 70 (method element 93) to provide the appropriate volume of working fluid. The method 81 may engage the guide vane actuator 69 to position the adjustable guide vanes 67 to the appropriate position (method element 95). The method 81 may control the bypass subsystem 59 to provide the first flow rate to the compressor 21 and the second flow rate to other uses (method element 97).

Figure 4:
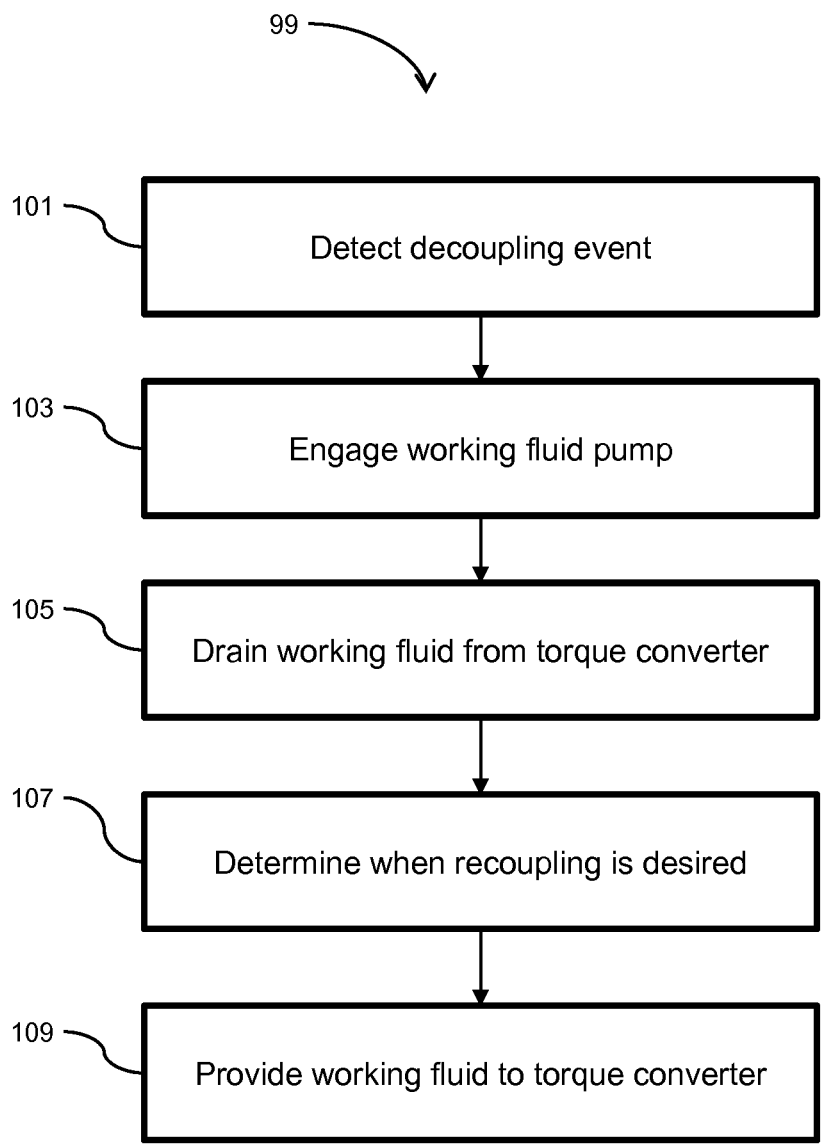
FIG. 4 is a flow chart of an exemplary method of decoupling a fan from a gas turbine system.

Illustrated in FIG. 4 is a method for decoupling and recoupling the fan 41 from the gas turbine system 13 (method 99). The method 99 may detect a decoupling event (method element 101). A decoupling event may be a failure of the fan 41 or other components of the supercharger and bypass system 17. The method 99 may engage the working fluid pump (method element 103) to drain the working fluid from the torque converter (method element 105). To recouple the torque converter 60, method 99 may determine when recoupling is desired (method element 107). The method 99 may provide working fluid to the torque converter (method element 109) to recouple the fan 41 to the gas turbine system 13.

The supercharged system 11 provides a number of advantages. Technically, the supercharging system shifts and increases the base load capacity of the gas turbine. The supercharger and bypass system 17 combined with the torque converter system 46 allows the fan 41 to run at variable speeds. The supercharged system 11 does not have electrical losses associated with motor driven equipment.

Commercially, the supercharged system 11 may operate with fewer gas turbine systems 13 to achieve a desired electrical output capacity for a large scale power generation facility with a design (rating) point at high ambient temperature and/or low atmospheric pressure. This is particularly beneficial for applications with lower cost fuel sources and/or for limited seasonal operation at peak electrical demands.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A supercharging system for a gas turbine system having a compressor, a combustor, a turbine and a shaft, the supercharging system comprising:
    a fan assembly that provides an air stream;
    a torque converter coupled to the shaft and the fan assembly;
    a subsystem for conveying a first portion of the air stream output to the compressor; and
    a bypass subsystem for optionally conveying a second portion of the air stream output to other uses, the supercharging system further comprising a control subsystem that controls the torque converter thereby controlling the air stream flow rate, wherein the control subsystem that controls the torque converter comprises a torque converter control subsystem that controls a working fluid pump and adjustable guide vanes in the torque converter and the gas turbine system further comprises a heat recovery steam generator, and wherein the bypass subsystem conveys the second portion of the air stream output to the heat recovery steam generator.

2. The supercharging system of claim 1 further comprising a control system that controls the bypass subsystem.

3. The supercharging system of claim 1 wherein the bypass subsystem comprises a variable geometry diverter.

4. The supercharging system of claim 1 wherein a supercharger controller controls the second portion of the air stream output.

5. A gas turbine system comprising:
    a compressor;
    a combustor;
    a turbine;
    a shaft coupled to the turbine;
    a torque converter;
    a fan coupled to the torque converter generating an air stream; and
    a bypass subsystem that allocates the air stream between the compressor and other uses, further comprising a control system that controls the bypass subsystem and
    the gas turbine system further comprises a heat recovery steam generator, wherein the bypass subsystem conveys a second portion of the air stream output to the heat recovery steam generator.

6. The gas turbine system of claim 5 wherein the torque converter comprises a working fluid pump and adjustable guide vanes.

7. The gas turbine system of claim 6 further comprising a control subsystem that controls the working fluid pump and the adjustable guide vanes.

8. The gas turbine system of claim 5 further comprising a heat recovery steam generator coupled to the turbine and a variable geometry diverter disposed between the fan and the heat recovery steam generator.

9. The gas turbine system of claim 5 wherein the bypass subsystem comprises a variable geometry diverter.

10. The gas turbine system of claim 9 wherein the variable geometry diverter comprises a conduit and a damper.

11. The gas turbine system of claim 5 wherein the fan comprises a variable pitch blade.

12. A method of operating a gas turbine comprising:
    coupling a fan assembly to a turbine system shaft with a torque converter;
    determining a first flow rate to be provided to a compressor in the gas turbine;
    determining a second flow rate to be provided to other uses; and
    providing the first flow rate to the compressor, and the second flow rate to the other uses, wherein the gas turbine is part of a combined cycle system having a heat recovery steam generator, and further comprising purging the heat recovery steam generator with the second flow rate;
    and the method further comprises conveying the second flow rate to the heat recovery steam generator and wherein providing the first flow rate to the compressor, and the second flow rate to the other uses comprises controlling a working fluid pump and adjustable guide vanes in the torque converter.

13. The method of operating a gas turbine of claim 12 further comprising:
    detecting a decoupling event; and
    draining a working fluid from the torque converter.

14. The method of operating a gas turbine of claim 13 further comprising:
    determining when recoupling is desired; and
    providing the working fluid to the torque converter.

* * * * *